US 011608406 B2

(12) United States Patent
Weikard et al.

(10) Patent No.: US 11,608,406 B2
(45) Date of Patent: Mar. 21, 2023

(54) METHOD AND SYSTEM FOR PRODUCING A POLYURETHANE POLYMER BY MEANS OF A SUPPORTED CATALYST

(71) Applicant: COVESTRO INTELLECTUAL PROPERTY GMBH & CO. KG, Leverkusen (DE)

(72) Inventors: Jan Weikard, Leverkusen (DE); Holger Mundstock, Wermelskirchen (DE); Dagmar Huertgen, Leverkusen (DE); Goenuel-Hava Yelkaya, Leverkusen (DE); Marc Schreiber, Leverkusen (DE)

(73) Assignee: Covestro Deutschland AG, Leverkusen (DE)

( * ) Notice: Subject to any disclaimer, the term of this patent is extended or adjusted under 35 U.S.C. 154(b) by 428 days.

(21) Appl. No.: 16/976,118

(22) PCT Filed: Feb. 25, 2019

(86) PCT No.: PCT/EP2019/054617
§ 371 (c)(1),
(2) Date: Aug. 27, 2020

(87) PCT Pub. No.: WO2019/166372
PCT Pub. Date: Sep. 6, 2019

(65) Prior Publication Data
US 2020/0407484 A1 Dec. 31, 2020

(30) Foreign Application Priority Data
Feb. 27, 2018 (EP) ..................... 18158908

(51) Int. Cl.
*C08G 18/50* (2006.01)
*B01J 8/00* (2006.01)
(Continued)

(52) U.S. Cl.
CPC .......... *C08G 18/5045* (2013.01); *B01J 8/001* (2013.01); *B01J 8/004* (2013.01); *C08G 18/222* (2013.01);
(Continued)

(58) Field of Classification Search
CPC  C08G 18/5045; C08G 18/222; C08G 18/227; C08G 18/246; C08G 18/6225;
(Continued)

(56) References Cited

U.S. PATENT DOCUMENTS 3,136,731 A * 6/1964 Piechota ................ C08G 18/16
528/48
3,989,228 A 11/1976 Morris et al.
(Continued)

FOREIGN PATENT DOCUMENTS

EP        0396092 A2   11/1990
GB         927004 A     5/1963
WO   WO-2005042604 A1   5/2005

OTHER PUBLICATIONS

International Search Report for PCT/EP2019/054617 dated Jun. 6, 2019.
(Continued)

*Primary Examiner* — Rabon A Sergent
(74) *Attorney, Agent, or Firm* — The Webb Law Firm

(57) ABSTRACT

A process for preparing a polyurethane polymer comprises the step of:
I) mixing a first component (100) comprising a polyisocyanate with a second reactant component (200) comprising a compound having Zerewitinoff-active hydrogen atoms in a mixing vessel (300) to obtain a reaction mixture (400),
wherein the first reactant component (100) and/or the second reactant component (200) are contacted with a catalyst
(Continued)

bed (500) before they are mixed in the mixing vessel (300) and/or the reaction mixture (400) is contacted with a catalyst bed (500), wherein the catalyst bed (500) contains a catalyst reversibly sorbed on a substrate, the catalyst catalyses the reaction of isocyanate groups with themselves or with Zerewitinoff-active compounds and the catalyst is released into the first component (100), second component (200) or reaction mixture (400) that is in contact with the catalyst bed (500), such that a reaction mixture (410) containing the catalyst is obtained.

15 Claims, 2 Drawing Sheets

(51) Int. Cl.
    *C08G 18/22* (2006.01)
    *C08G 18/24* (2006.01)
    *C08G 18/62* (2006.01)
    *C08G 18/79* (2006.01)

(52) U.S. Cl.
    CPC ......... *C08G 18/227* (2013.01); *C08G 18/246* (2013.01); *C08G 18/6225* (2013.01); *C08G 18/792* (2013.01); *B01J 2208/0053* (2013.01); *B01J 2208/00823* (2013.01); *B01J 2208/00902* (2013.01)

(58) Field of Classification Search
    CPC ......... C08G 18/792; B01J 8/001; B01J 8/004; B01J 2208/0053; B01J 2208/00823; B01J 2208/00902
    See application file for complete search history.

(56) References Cited

U.S. PATENT DOCUMENTS

| | | |
|---|---|---|
| 4,341,689 A | 7/1982 | Doshi et al. |
| 2007/0060731 A1 | 3/2007 | Wind et al. |

OTHER PUBLICATIONS

Written Opinion of the International Searching Authority for PCT/EP2019/054617 dated Jun. 6, 2019.

* cited by examiner

METHOD AND SYSTEM FOR PRODUCING A POLYURETHANE POLYMER BY MEANS OF A SUPPORTED CATALYST

CROSS-REFERENCE TO RELATED APPLICATIONS

This application is a national stage application (under 35 U.S.C. § 371) of PCT/EP2019/054617, filed Feb. 25, 2019, which claims benefit of European Application No. 18158908.6, filed Feb. 27, 2018, both of which are incorporated herein by reference in their entirety.

The present invention relates to a process for preparing a polyurethane polymer, comprising the step of mixing a first reactant component comprising a polyisocyanate with a second reactant component comprising a compound having Zerewitinoff-active hydrogen atoms in a mixing vessel to obtain a reaction mixture. The first reactant component and/or the second reactant component is contacted with a catalyst bed before being mixed in the mixing vessel and/or the reaction mixture is contacted with a catalyst bed. The invention likewise relates to a system for preparation of a polyurethane polymer with a catalyst bed.

A general problem with conventional 2K (two-component) PUR systems is that the curing reaction commences with the mixing of polyol and polyisocyanate. Therefore, these systems are characterized by two essential performance properties: the processing time and the drying time. Rapid drying is desirable for efficient processes. For this purpose, the system is typically accelerated with catalysts such as DBTL to such a degree that there is sufficient processing time, for example for spray application in automotive refinishing. In this case, the paint material required is mixed when operations commence and is utilized for the entire painting operation.

However, this has the disadvantage that, when work is stopped, the rise in viscosity in the paint formulation continues to progress owing to the presence of the catalyst. Then, after the processing time has elapsed, paint yet to be applied would have to be disposed of.

In heterogeneously catalysed chemical reactions, the immobilized catalyst can be separated easily from the reaction mixture. For instance, WO 2005/042604 A1 relates to a process for preparing prepolymers containing isocyanate groups by reacting a) diisocyanates with b) compounds having at least two hydrogen atoms reactive with isocyanate groups in the presence of c) catalysts, and subsequent removal of the excess monomeric diisocyanate, wherein the diisocyanates a) used are asymmetric diisocyanates and the catalysts c) used are organometallic catalysts, and these organometallic catalysts are removed, blocked or deactivated prior to the removal of the monomeric diisocyanates. In embodiments described therein, the catalysts may be heterogeneous catalysts and may have been applied to a support.

One example in WO 2005/042604 A1 describes the preparation of a heterogeneous catalyst as follows: 6.25 g of dibutyltin dilaurate was supplemented with absolute ethanol to 23 ml of total solution. While gently stirring, 25 g of commercially available TIMREX HSAG 100 graphite was added to the impregnation solution. The support was thus impregnated with the impregnation solution in accordance with its ethanol absorption capacity (0.92 ml/g). After an impregnation time of 1 h, the catalyst was dried in a drying cabinet at 50° C. for 16 h. The preparation of the prepolymer is described as follows: at a fixed molar 2,4'-MDI:PPG450 ratio of 7:1, 0.015% by weight, based on the total starting amount of polyol and isocyanate component, of the heterogeneous DBTL-activated carbon catalyst is added to the 2,4'-MDI and, subsequent to the prepolymer synthesis, removed from the reaction mixture by filtration.

For the purposes of the invention described in WO 2005/042604 A1, it is necessary for the urethanization catalyst to be very substantially removed from the reaction mixture since unwanted further reaction to give higher molecular weight prepolymers during the storage of the product would otherwise be expected. Therefore, the concept of WO 2005/042604 A1 cannot be applied to the application of polyurethane systems that react over a prolonged period of time, as used in paints and other coatings.

The problem addressed by the present invention is that of at least partly overcoming the disadvantages in the prior art. More particularly, the problem addressed was that of providing a process and a system with which the processing of 2-component polyurethane paints (2K PUR paints) can be interrupted without the need to dispose of paint yet to be applied as unusable because its viscosity has become too high in the meantime.

The object is achieved in accordance with the invention by a process as claimed in claim 1 and a system as claimed in claim 11. Advantageous developments are specified in the dependent claims. They may be freely combined unless the opposite is clear from the context.

A process for preparing a polyurethane polymer comprises the step of:
I) mixing a first reactant component comprising a polyisocyanate with a second reactant component comprising a compound having Zerewitinoff-active hydrogen atoms in a mixing vessel to obtain a reaction mixture,
wherein the first reactant component and/or the second reactant component are contacted with a catalyst bed before they are mixed in the mixing vessel and/or the reaction mixture is contacted with a catalyst bed, wherein the catalyst bed contains a catalyst reversibly sorbed on a substrate, the catalyst catalyses the reaction of isocyanate groups with themselves or with Zerewitinoff-active compounds and the catalyst is released into the first component, second component or reaction mixture that is in contact with the catalyst bed, such that a reaction mixture containing the catalyst is obtained.

In the process according to the invention, a catalyst bed containing a catalyst reversibly sorbed on a substrate is used. The catalyst bed is regarded here as being a defined volume which contains substrate and catalysts and from which the substrate cannot depart (for example through use of sieve inserts).

It is envisaged in accordance with the invention that the catalyst is reversibly sorbed on the substrate. Possible options here include both an adsorption and an absorption. The sorption can be effected by impregnating the substrate with a solution of the catalyst and then evaporating the solvent. The fact that the sorption is reversible means that sorbed catalyst can also be released again to a liquid phase in an amount effective for catalysis of the reaction. It is therefore also preferable that the substrate is not graphite or activated carbon.

Suitable substrates may be solid catalysts and catalyst supports as known from heterogeneous catalysis. These also include zeolites/molecular sieves such as zeolite A and zeolite X, and other porous ceramics. Examples of suitable catalysts are titanium catalysts, zirconium catalysts, bismuth catalysts, tin catalysts and/or iron-containing catalysts. Preference is given to dialkyltin dicarboxylates and bismuth carboxylates.

The loading of the substrate with the catalyst may be within a range from ≥1% to ≤50% by weight, based on the total weight of the catalyst-laden substrate. Preference is given to loadings of ≥5% to ≤30% by weight, more preferably ≥10% by weight to ≤20% by weight.

The process according to the invention has the advantage that the reaction mixture can be provided with catalyst when desired, but the addition of catalyst can also be stopped. Thus, the reaction mixture can be stored without catalyst for much longer in the mixing vessel and only passed through the catalyst bed when required to accelerate the reaction.

The process according to the invention can be performed, for example, by means of a modified spray gun. The first and second reactant components are mixed here in a reservoir vessel, but still do not contain any catalyst. By means of compressed air or suction, this reaction mixture is conveyed into a discharge conduit to the nozzle. In the course of this, the reaction mixture passes through the catalyst bed and hence provided with the catalyst required. If the painting operation has to be stopped, the reaction mixture present in the reservoir vessel, for lack of catalyst, reacts only very slowly, if at all.

Suitable Zerewitinoff-active compounds or compounds having Zerewitinoff-active hydrogen atoms (also called NCO-reactive compounds hereinafter) are especially polyols, polyamines and polythiols. Preference is given to those compounds that react with polyisocyanates to give polyaddition compounds, especially polyurethanes, under conditions customary in coating technology. These include, for example, compounds having an average OH functionality of at least 1.5. These may, for example, be low molecular weight diols (e.g. ethane-1,2-diol, propane-1,3- or -1,2-diol, butane-1,4-diol), triols (e.g. glycerol, trimethylolpropane) and tetraols (e.g. pentaerythritol), polythiols, but also polyhydroxy compounds such as polyether polyols, polyester polyols, polyurethane polyols (OH-terminated prepolymers), polysiloxane polyols, polycarbonate polyols, polybutadiene polyols, polyacrylate polyols and/or polymethacrylate polyols and copolymers thereof (polyacrylate polyols hereinafter).

Suitable polyols preferably have mass-average molecular weights Mw of >500 daltons, measured by means of gel permeation chromatography (GPC) to DIN 55672-1:2016-03 in tetrahydrofuran at 25° C. against a polystyrene standard, more preferably between 800 and 100 000 daltons, especially between 1000 and 50 000 daltons. Suitable polyhydroxy compounds preferably have an OH number (DIN EN ISO 4629-2:2016) of 30 to 400 mg KOH/g, especially between 100 and 300 KOH/g.

The Zerewitinoff-active compound is preferably selected from the group consisting of polyacrylate polyols and polyester polyols, especially polyacrylate polyols.

Suitable polyisocyanates are any polyisocyanates known to those skilled in the art to be suitable for the production of polyisocyanate polyaddition products, especially polyurethanes, especially the group of the organic aliphatic, cycloaliphatic, araliphatic and/or aromatic polyisocyanates having at least two isocyanate groups per molecule, and mixtures thereof. Examples of polyisocyanates of this kind are di- or triisocyanates, for example butane 1,4-diisocyanate, pentane 1,5-diisocyanate (pentamethylene diisocyanate, PDI), hexane 1,6-diisocyanate (hexamethylene diisocyanate, HDI), 4-isocyanatomethyloctane 1,8-diisocyanate (triisocyanatononane, TIN), 4,4'-methylenebis(cyclohexyl isocyanate) (H12MDI), 3,5,5-trimethyl-1-isocyanato-3-isocyanatomethylcyclohexane (isophorone diisocyanate, IPDI), 1,3- and 1,4-bis(isocyanatomethyl)cyclohexane (H6XDI), naphthalene 1,5-diisocyanate, diisocyanatodiphenylmethane (2,2'-, 2,4'- and 4,4'-MDI or mixtures thereof), diisocyanatomethylbenzene (tolylene 2,4- and 2,6-diisocyanate, TDI) and technical grade mixtures of the two isomers, and also 1,3- and/or 1,4-bis(isocyanatomethyl)benzene (XDI), 3,3'-dimethyl-4,4'-biphenyl diisocyanate (TODI), paraphenylene 1,4-diisocyanate (PPDI), tetramethylxylylene 1,3-diisocyanates (TMXDI) and cyclohexyl diisocyanate (CHDI) and the oligomers of higher molecular weight that are obtainable individually or in a mixture from the above and have biuret, uretdione, isocyanurate, iminooxadiazinedione, allophanate, urethane and carbodiimide/uretonimine structural units. Preference is given to the use of polyisocyanates based on aliphatic and cycloaliphatic diisocyanates. More preferably, the at least one polyisocyanate is a derivative of hexamethylene diisocyanate and/or of pentamethylene diisocyanate, especially a hexamethylene diisocyanate trimer and/or a pentamethylene diisocyanate trimer. In another preferred embodiment, the polyisocyanate may contain one or more hydrophilizing groups, for example polyethylene oxide units or neutralized sulfonate groups. It is also possible that the polyisocyanate is an NCO-terminated prepolymer.

The ratio of polyisocyanates to NCO-reactive compounds, based on the molar amounts of the polyisocyanate groups relative to the NCO-reactive groups, is preferably 0.5:1.0 to 3.0:1.0. Particular preference is given to a ratio of 0.9:1.0 to 1.5:1.0 Very particular preference is given to a ratio of 1.05:1.0 to 1.5:1.0

The reaction mixture preferably comprises at least one NCO-reactive compound selected from the group consisting of polyacrylate polyols and polyester polyols, and at least one polyisocyanate, where the polyisocyanate is a derivative of hexamethylenediamine diisocyanate and/or of pentamethylene diisocyanate. The reaction mixture further preferably comprises a polyacrylate polyol as NCO-reactive compound, and a derivative of hexamethylene diisocyanate and/or of pentamethylene diisocyanate as polyisocyanate. The reaction mixture especially preferably comprises polyacrylate polyol as NCO-reactive compound, and a hexamethylene diisocyanate trimer and/or a pentamethylene diisocyanate trimer as polyisocyanate.

The reaction mixture may further comprise additives, for example light stabilizers such as UV absorbers and sterically hindered amines (HALS), and also stabilizers, fillers, pigments and antisettling agents, defoaming, anticratering and/or wetting agents, leveling agents, film-forming auxiliaries, reactive diluents, solvents, substances for rheology control, slip additives and/or components which prevent soiling and/or improve the cleanability of the cured coatings, and also flatting agents.

In one embodiment of the process, a stream of the first reactant component is mixed with a stream of the second reactant component in a mixer to obtain a stream of the reaction mixture, and at least one stream selected from the stream of the first reactant component, the stream of the second reactant component and the stream of the reaction mixture flows through the catalyst bed, such that the catalyst is released into the stream that flows through the catalyst bed. This embodiment of the process according to the invention is preferably a continuous process. Suitable mixers may, as well as simple T mixers, also be the static and dynamic mixing heads known from polyurethane technology.

In a further embodiment of the process, the catalyst is released in such a way that the reaction mixture containing the catalyst contains the catalyst in a proportion of ≥1 ppm to ≤5000 ppm, based on the weight of the reaction mixture. The proportion is preferably ≥10 ppm to ≤1000 ppm, more preferably ≥50 ppm to ≤500 ppm.

In a further embodiment of the process, the reaction mixture comes into contact with the catalyst bed, and the first and second reactant components do not come into contact with the catalyst bed. Thus, the catalyst bed is downstream of a mixing vessel or mixing head in flow direction of the reaction mixture to be discharged.

In a further embodiment of the process, the first and second reactant components do not contain any catalyst before they are mixed in the mixing vessel.

In a further embodiment of the process, the substrate in the catalyst bed comprises particles having channels that have an extent in at least one spatial direction of ≥1 angström to ≤50 angströms, preferably ≥1.5 angströms to ≤30 angströms and more preferably ≥2.5 angströms to ≤20 angströms. The particles may have a maximum longitudinal extent of ≥0.1 cm to ≤3 cm, preferably ≥0.5 cm to ≤2.5 cm, and have a spherical or spheroidal shape. Such substrates are commercially available as sodium aluminium silicate molecular sieves.

In a further embodiment of the process, the catalyst selected is dimethyltin dilaurate, dibutyltin dilaurate, dioctyltin dilaurate, tin bis(dodecylmercaptide), tin bis(2-ethylhexylthioglycolate), tin diacetate, tin maleate, bisthioglyceroltin, octyltin tris(2-ethylhexylthioglycolate), bis(β-methoxycarbonylethyl)tin dilaurate, tetraisopropyl titanate, tetra-tert-butyl orthotitanate, tetra(2-ethylhexyl)titanium and bis(ethylacetoacetato)titanium diisopropoxide, bismuth (III) tris(2-ethylhexanoate), bismuth laurate or mixtures thereof.

In a further embodiment of the process, the catalyst bed is in the form of at least one exchangeable cartridge. If the catalyst bed should have become unusable as a result of polymerized resin when operation is interrupted, all that is needed is for a fresh cartridge to be inserted. The same is true if the catalyst bed is exhausted owing to the extent of operation and can no longer release any catalyst.

In a further embodiment of the invention, the catalyst bed is in the form of a multitude of mutually fluidically sealed channels which contain substrates and catalysts sorbed thereon, and through which the first reactant component, the second reactant component or the reaction mixture flows independently of one another on instruction by a control unit. In this way, it is possible to achieve more homogeneous release of the catalyst over a longer period of time. When the control unit determines that there is no longer any catalyst to be used present in a channel, operation is switched to another channel, and the release of the catalyst can be continued.

In a further embodiment of the process, the catalyst bed was purged with a solvent before the start of the process. In this way, it is possible to avoid release of an unintentionally large amount of the catalyst at the start of contacting of the catalyst bed.

The invention likewise relates to a system for preparation of a polyurethane polymer, comprising a mixing vessel for mixing of a first and second reactant component to obtain a reaction mixture, wherein the system has at least one catalyst bed with which the first or second reactant component comes into contact before it enters the mixing vessel and/or which is contacted by the reaction mixture before it leaves the mixing vessel, and wherein the catalyst bed contains a catalyst sorbed reversibly on a substrate for catalysis of the reaction of isocyanate groups with themselves or with Zerewitinoff-active compounds. For details with regard to reaction component, catalysts, substrates and the like, for avoidance of repetition, reference is made to the above remarks relating to the process according to the invention.

In one embodiment of the system, the catalyst bed is in the form of at least one exchangeable cartridge. As already mentioned, this increases the flexibility of the system. If the catalyst bed should have become unusable as a result of polymerized resin when operation is interrupted, all that is needed is for a fresh cartridge to be inserted. The same is true if the catalyst bed is exhausted owing to the extent of operation and can no longer release any catalyst.

In a further embodiment of the system, the catalyst bed is in the form of a multitude of mutually fluidically sealed channels which contain substrates and catalysts sorbed thereon, and through which the first reactant component, the second reactant component or the reaction mixture flows independently of one another on instruction by a control unit. As already mentioned, it is possible in this way to achieve more homogeneous release of the catalyst over a longer period of time. When the control unit determines that there is no longer any catalyst to be used present in a channel, operation is switched to another channel, and the release of the catalyst can be continued.

In a further embodiment of the system, the system is designed as a spray gun with a conduit for transport of the reaction mixture out of the mixing vessel to a nozzle and the catalyst bed is disposed in said conduit.

In a further embodiment of the system, the mixing vessel is designed as a mixing head that mixes a stream of the first reactant component with a stream of second reactant component to obtain a stream of the reaction mixture, and at least one stream selected from the stream of the first reactant component, the stream of the second reactant component and the stream of the reaction mixture flows through the catalyst bed, such that the catalyst is released into the stream that flows through the catalyst bed.

BRIEF DESCRIPTION OF THE DRAWINGS

The invention is further described by reference to the figures that follow, but without being limited thereto. The figures show:

FIG. 1 shows a system according to the invention in the form of a spray gun. Already present in the mixing vessel 300 is a reaction mixture 400 of the first reactant component 100 comprising a polyisocyanate and the second reactant component 200 comprising a polyol. If compressed air is applied to the conduit section 310, the effect of this is that reaction mixture 400 is sucked into the suction tube 320. The reaction mixture 400 passes through the catalyst bed 500 disposed in an exchangeable cartridge 600 in the flow path of the reaction mixture 400. As it passes through the catalyst bed, catalyst is released to the reaction mixture, such that catalyst-containing reaction mixture 410 can leave the spray gun. This reaction mixture 410 can then be applied as paint to a surface. The cartridge 600 may be introduced into the conduit 320, for example by means of two screw threads at their ends.

FIG. 2 shows a further system according to the invention in the form of a spray gun. Already present in the mixing vessel 300 is a reaction mixture 400 of the first reactant component 100 comprising a polyisocyanate and the second reactant component 200 comprising a polyol. If compressed air is applied to the conduit section 310, the effect of this is that reaction mixture 400 is sucked into the suction tube 320. The reaction mixture 400 passes through the catalyst bed 500 disposed in an exchangeable cartridge 600 in the flow path of the reaction mixture 400. As it passes through the catalyst bed, catalyst is released to the reaction mixture, such that catalyst-containing reaction mixture 410 can leave the spray gun. This reaction mixture 410 can then be applied as paint to a surface. The cartridge 600 may be introduced into the conduit 320, for example by means of two screw threads at their ends. By contrast with the spray gun shown in FIG. 1, the cartridge 600 with the catalyst bed 500 is disposed closer to the nozzle. According to the application, the cartridge 600 may also constitute the discharge nozzle for the paint.

In FIG. 4, the cartridge is disposed in the flow path of the first reactant component 100 before it enters the mixing head 300. In FIG. 5, the cartridge is disposed in the flow path of the second reactant component 200 before it enters the mixing head 300.

Figure 1:
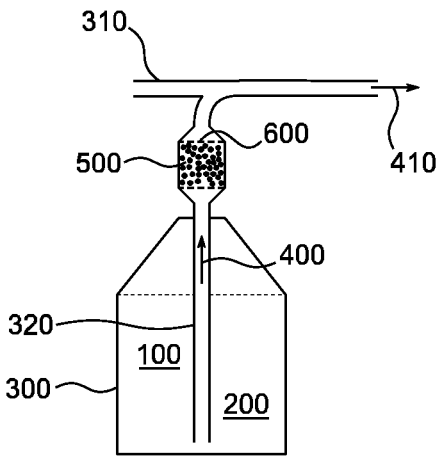
FIGS. 1 and 2 schematics of systems according to the invention in the form of a spray gun FIGS. 3, 4 and 5 schematics of systems according to the invention in the form of a mixing head
Figure 2:
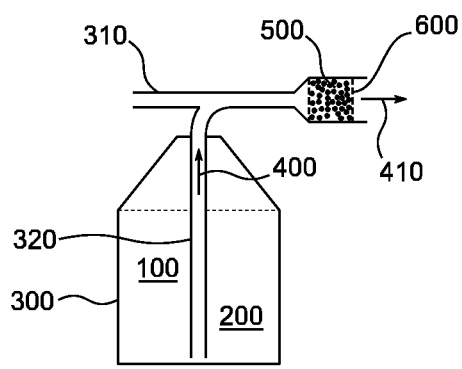
Figure 3:
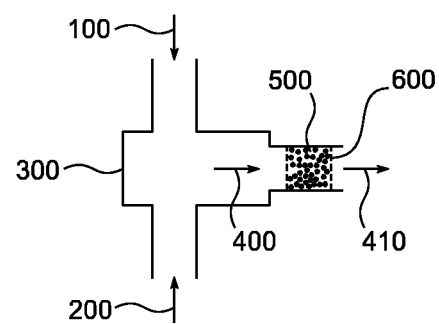
FIG. 3 shows a system according to the invention that is suitable for continuous applications. The mixing vessel here is designed as a mixing head 300 in which a stream of the first reactant component 100 comprising a polyisocyanate and a stream of the second reactant component 200 comprising a polyol meet and are mixed, and form the non-catalyst-containing reaction mixture 400. The stream of this reaction mixture 400 passes through the catalyst bed 500 disposed in an exchangeable cartridge 600 in the flow path of the reaction mixture 400. As it passes through the catalyst bed, catalyst is released to the reaction mixture, such that catalyst-containing reaction mixture 410 can leave the spray gun. This reaction mixture 410 can then be applied as paint to a surface. The cartridge 600 may be introduced between the mixing head outlet and further conduits, for example, by means of two screw threads at their ends.
Figure 4:
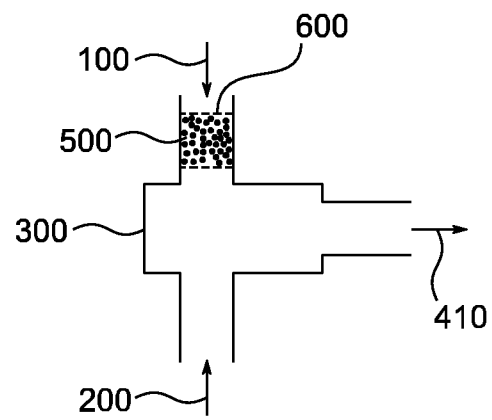
FIGS. 4 and 5 show variants of the positioning of the cartridge 600 compared to the embodiment shown in FIG. 3.
Figure 5:
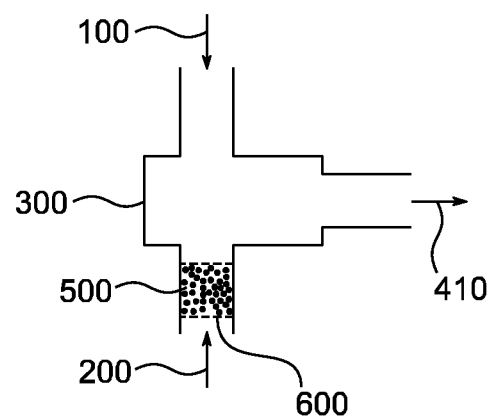

The invention is illustrated in detail by the examples which follow, but without being restricted thereto. The substrate used in Examples 1 and 2 was Sylobead MS 548, a molecular sieve of the 13× type having a pore size of about 10 angströms and an average particle size of 1.5 mm. The isocyanate component (B) and the polyol component (A) had the following compositions (figures in parts by weight):

| Component A | |
|---|---|
| Setalux D A HS 1272 (about 72% in BA); polyacrylate polyol | 137.75 |
| Tego Airex 945 | 0.50 |
| Tinuvin 292 (50% in butyl acetate) | 1.48 |
| Tinuvin 384-2 (50% in butyl acetate) | 2.20 |
| Butyl acetate | 4.35 |
| Butyl acetate/methoxypropyl acetate/xylene (1/1/1) | 20.35 |
| Component B | |
| Desmodur N 3900; aliphatic polyisocyanate resin based on HDI | 47.63 |
| BuAc/MPA/xylene (1/1/1) | 35.70 |
| Sum | 249.96 |

In the examples, the abbreviations "BA" and "BuAc" each mean butyl acetate. "MPA" stands for methoxypropyl acetate.

Flow times in seconds (s) were determined with a 4 mm DIN cup in accordance with DIN EN ISO 2431 RT: room temperature (20° C.).

Flow time as a measure for description of the progression of the reaction was monitored directly after mixing and up to a few hours thereafter. The samples according to the invention showed accelerated reaction compared to the uncatalysed variant.

The parameters "T1" and "T3" relate to the monitoring of the degree of drying of the coatings applied by doctor blade according to DIN EN ISO 9117-5. The paints were applied to a glass plate with a doctor blade and predried (a) at room temperature (RT, 23° C., 50% rel. humidity) and (b) in a Heraus air circulation oven at 60° C. for 30 min, and then the attainment of the degree of drying was monitored at room temperature (23° C., 50% rel. humidity) over time.

EXAMPLE 1

30 g of the Sylobead MS 548 substrate containing 6 g (20% by weight) of DBTL (dibutyltin dilaurate) was used. In experiment Nos. 1-1 to 1-4, 250 g of the paint material in each case was passed through a high-speed sieve that contained the supported catalyst material, and was then collected again for the purpose of testing. No. 1-5 is a comparative example without catalysis of the reaction mixture.

The catalyst was released to the paint material in such a way that elevated reactivity and drying rate was apparent even as the fourth portion of the paint material was being passed through:

| | | | No. | | | |
|---|---|---|---|---|---|---|
| | | 1-1 | 1-2 | 1-3 | 1-4 | 1-5 (comparison) |
| Weight before passage [g] | | 250 | 250 | 250 | 250 | — |
| Flow time [s] | 0 h | 25 | 25 | 25 | 25 | 25 |
| | 0.5 h | >100 | 58 | 35 | 31 | 25 |
| | 1.0 h | — | >100 | 78 | 50 | 25 |
| | 1.5 h | — | — | >100 | 100 | 26 |
| Drying [h] at RT | T 1 | 1 | 1 | 2 | 2 | >6 |
| | T 3 | 2 | 4.5 | 7 | >7 | >7 |
| Drying [h] after 30 min. at 60° C. | T 1 | immediate | immediate | immediate | immediate | immediate |
| | T 3 | immediate | immediate | immediate | iimmediate | >6 |

EXAMPLE 2: COMPARISON OF CONVENTIONALLY CATALYSED PAINT SYSTEMS (NO. 1-3) WITH SUPPORTED CATALYST MATERIAL (NO. 4-6) IN SPRAY APPLICATIONS

Coating Formulations:

| | 2-1 | 2-2 | 2-3 | 2-4 to 2-6 |
|---|---|---|---|---|
| Component A | | | | |
| Setalux D A HS 1272 (about 72% in BA) | 53.64 | 53.64 | 53.64 | 53.66 |
| Byk 331 | 0.29 | 0.29 | 0.29 | 0.29 |
| Byk 141 | 0.14 | 0.14 | 0.14 | 0.14 |
| Tinuvin 292 (50% in BA) | 0.57 | 0.57 | 0.57 | 0.58 |

-continued

|  | 2-1 | 2-2 | 2-3 | 2-4 to 2-6 |
|---|---|---|---|---|
| Tinuvin 384-2 (50% in BA) | 0.87 | 0.87 | 0.87 | 0.87 |
| DBTL (1% in BA) | 1.73 | | | |
| TIB Kat 216 (1% in BA) | | 1.73 | | |
| K-Kat XK 651 (1% in BA) | | | 1.73 | |
| BuAc/MPA/xylene (1/1/1) | 10.22 | 10.22 | 10.22 | 11.11 |
| Component B | | | | |
| Desmodur N 3900 | 19.20 | 19.20 | 19.20 | 19.21 |
| BuAc/MPA/xylene (1/1/1) | 13.33 | 13.33 | 13.33 | 14.14 |
| Sum | 100.00 | 100.00 | 100.00 | 100.00 |

In experiments 2-4 to 2-6, different catalysts were added to 30 g of the Sylobead MS 548 substrate. Experiment 2-4 contained 6 g (20% by weight) of DBTL (dibutyltin dilaurate). Experiment 2-5 contained 6 g (20% by weight) of TIB Kat 216 (dioctyltin dilaurate). Experiment 2-6 contained 6 g (20% by weight) of K-Kat XK 651 (bismuth carboxylate).

Experiments 2-1 to 2-3 were designed as comparative examples (conventional catalysis) for spray application under conventional conditions for automotive clearcoat refinishing.

Experiments 2-4 to 2-6 were each passed through a high-speed sieve containing the supported catalyst material prior to the spray application. Thereafter, the paint material was used to conduct an analogous spray application.

A comparison of the drying properties shows that the inventive systems 2-4 to 2-6 showed much faster drying after application.

| | Experiment | | | | | |
|---|---|---|---|---|---|---|
| Drying | 2-1 | 2-2 | 2-3 | 2-4 | 2-5 | 2-6 |
| 30' - 60° C.  T 3 | 4 h 35 min | 6 h 33 min | 5 h 35 min | 30 min | immediate | 1 h |

Comparison of the optical coating properties and processing time:

| Experiment | 2-1 | 2-3 | 2-4 | 2-6 |
|---|---|---|---|---|
| Application immediately after mixing of the paint systems (components A + B) | | | | |
| Appearance: | | | | |
| Gloss 20° | 90 | 90 | 90 | 89 |
| Haze | 19 | 13 | 16 | 22 |
| Application 3 h after mixing of the paint systems (components A + B) | | | | |
| Appearance: | | | | |
| Gloss 20° (ISO 2813) | 74 | 87 | 90 | 90 |
| Haze (ASTM D 1003) | 220 | 94 | 15 | 17 |

In the case of application immediately after mixing of components A and B, all paint systems showed good optical properties (high gloss and low haze). In the case of application three hours after mixing, only the inventive systems 2-4 and 2-6 examined showed good optical properties and hence a long processing time.

The invention claimed is:

1. A process for preparing a polyurethane polymer, comprising the step of:

I) mixing a first reactant component comprising a polyisocyanate with a second reactant component comprising a compound having Zerewitinoff-active hydrogen atoms in a mixing vessel to obtain a reaction mixture, wherein the first reactant component and/or the second reactant component are contacted with a catalyst bed before they are mixed in the mixing vessel and/or the reaction mixture is contacted with a catalyst bed, wherein the catalyst bed contains a catalyst reversibly sorbed on a substrate, the catalyst catalyses the reaction of isocyanate groups with themselves or with Zerewitinoff-active compounds, and the catalyst is released into the first component, second component or reaction mixture that is in contact with the catalyst bed, such that a reaction mixture containing the catalyst is obtained.

2. The process according to claim 1, wherein:

a stream of the first reactant component is combined with a stream of the second reaction component in a mixer to obtain a stream of the reaction mixture and at least one stream selected from the stream of the first reactant component, the stream of the second reactant component and the stream of the reaction mixture flows through the catalyst bed, such that the catalyst is released into the stream that flows through the catalyst bed.

3. The process according to claim 1, wherein the catalyst is released in such a way that the reaction mixture containing the catalyst contains the catalyst in a proportion of ≥1 ppm to ≤5000 ppm, based on the weight of the reaction mixture.

4. The process according to claim 1, wherein the reaction mixture comes into contact with the catalyst bed, and the first and second reactant components do not come into contact with the catalyst bed.

5. The process according to claim 1, wherein the first and second reactant components do not contain any catalyst before being mixed in the mixing vessel.

6. The process according to claim 1, wherein the substrate in the catalyst bed comprises particles having channels that have an extent of ≥1 angstrom to ≤50 angstroms in at least one spatial direction.

7. The process according to claim 1, wherein the catalyst selected is dimethyltin dilaurate, dibutyltin dilaurate, dioctyltin dilaurate, tin bis(dodecylmercaptide), tin bis(2-ethylhexylthioglycolate), tin diacetate, tin maleate, bisthioglyceroltin, octyltin tris(2-ethylhexylthioglycolate), bis(β-methoxycarbonylethyl)tin dilaurate, tetraisopropyl titanate, tetra-tert-butyl orthotitanate, tetra(2-ethylhexyl)titanium and bis(ethylacetoacetato)titanium diisopropoxide, bismuth (III) tris(2-ethylhexanoate), bismuth laurate or mixtures thereof.

8. The process according to claim 1, wherein the catalyst bed is in the form of at least one exchangeable cartridge.

9. The process according to claim 1, wherein the catalyst bed is in the form of a multitude of mutually fluidically sealed channels which contain substrates and catalysts sorbed thereon, and through which the first reactant component, the second reactant component or the reaction mixture flows independently of one another on instruction by a control unit.

10. The process according to claim 1, wherein the catalyst bed has been purged with a solvent prior to commencement of the process.

11. A system for preparation of a polyurethane polymer, comprising a mixing vessel for mixing of a first and second reactant component to obtain a reaction mixture,
wherein
the system has at least one catalyst bed with which the first or second reactant component comes into contact before it enters the mixing vessel and/or which is contacted by the reaction mixture before it leaves the mixing vessel,
and wherein the catalyst bed contains a catalyst sorbed reversibly on a substrate for catalysis of the reaction of isocyanate groups with themselves or with Zerewitinoff-active compounds.

12. The system according to claim 11, wherein the catalyst bed is in the form of at least one exchangeable cartridge.

13. The system according to claim 11, wherein the catalyst bed is in the form of a multitude of mutually fluidically sealed channels which contain substrates and catalysts sorbed thereon, and through which the first reactant component, the second reactant component or the reaction mixture flows independently of one another on instruction by a control unit.

14. The system according to claim 11, wherein the system is designed as a spray gun with a conduit (320) for transport of the reaction mixture out of the mixing vessel to a nozzle and the catalyst bed is disposed in said conduit.

15. The system according to claim 11, wherein the mixing vessel is designed as a mixing head that mixes a stream of the first reactant component with a stream of second reactant component to obtain a stream of the reaction mixture and
at least one stream selected from the stream of the first reactant component, the stream of the second reactant component and a stream of the reaction mixture flows through the catalyst bed,
such that the catalyst is released into the stream that flows through the catalyst bed.

* * * * *